(12) United States Patent
Pircon et al.

(10) Patent No.: US 11,518,632 B2
(45) Date of Patent: Dec. 6, 2022

(54) ENCLOSURE AND DUST CAPTURE AND RECLAMATION SYSTEM AND ASSEMBLY FOR A TRADITIONAL ROLLER CONVEYOR

(71) Applicant: Benetech, Inc., Aurora, IL (US)

(72) Inventors: John S. Pircon, Aurora, IL (US); Robert Huskisson, Aurora, IL (US); Diego Arrivabene, Serra (BR); Kevin T. Jasin, Aurora, IL (US)

(73) Assignee: Benetech, Inc., Aurora, IL (US)

( * ) Notice: Subject to any disclaimer, the term of this patent is extended or adjusted under 35 U.S.C. 154(b) by 0 days.

(21) Appl. No.: 17/410,825

(22) Filed: Aug. 24, 2021

(65) Prior Publication Data

US 2022/0024707 A1 Jan. 27, 2022

Related U.S. Application Data

(63) Continuation of application No. 16/998,308, filed on Aug. 20, 2020, now Pat. No. 11,136,207.

(Continued)

(51) Int. Cl.
*B65G 21/08* (2006.01)
*B65G 21/10* (2006.01)
(Continued)

(52) U.S. Cl.
CPC ........... *B65G 69/181* (2013.01); *B65G 21/08* (2013.01); *B65G 33/08* (2013.01); *B65G 39/18* (2013.01);

(Continued)

(58) Field of Classification Search
CPC ......... B65G 21/08; B65G 21/10; B65G 21/20
(Continued)

(56) References Cited

U.S. PATENT DOCUMENTS

| 1,047,866 A | 12/1912 | Weller |
| 1,524,334 A | 1/1925 | Brown |

(Continued)

FOREIGN PATENT DOCUMENTS

| AU | 2005324346 A1 | 7/2006 |
| AU | 2005324346 B2 | 3/2011 |

(Continued)

OTHER PUBLICATIONS

Tsubaki Conveyor of America, Inc., One-Touch Inspection Door, product sheet, Summer 2010.

(Continued)

*Primary Examiner* — Douglas A Hess
(74) *Attorney, Agent, or Firm* — Greensfelder, Hemker & Gale, P.C.; Richard C. Himelhoch

(57) ABSTRACT

A dust capture and reclamation system for a rubber conveyor belt having a housing for mounting over a portion of the rubber conveyor belt, a plurality of idler roller assemblies, a plurality of return roller assemblies, a trough for mounting under the rubber conveyor belt to catch granular material falling from the rubber conveyor belt, the trough having an inside surface, a mechanism for moving granular material along the inside surface to a collection point, a first access panel through one side for accessing an idler roller, and a second access panel through one of the pair of opposed side walls for accessing a return roller assembly.

20 Claims, 12 Drawing Sheets

Related U.S. Application Data

(60) Provisional application No. 62/889,429, filed on Aug. 20, 2019.

(51) Int. Cl.
*B65G 21/20* (2006.01)
*B65G 69/18* (2006.01)
*B65G 39/18* (2006.01)
*B65G 33/08* (2006.01)

(52) U.S. Cl.
CPC ...... *B65G 69/188* (2013.01); *B65G 2201/042* (2013.01)

(58) Field of Classification Search
USPC ............................................ 198/860.3, 860.4
See application file for complete search history.

(56) References Cited

U.S. PATENT DOCUMENTS

| | | |
|---|---|---|
| 1,789,069 A | 1/1931 | Gove |
| 1,791,371 A | 2/1931 | Onstad |
| 1,800,920 A | 4/1931 | Wilson et al. |
| 1,814,619 A | 7/1931 | Carter |
| 1,896,149 A | 2/1933 | Zademach |
| 2,219,226 A | 10/1940 | Gerber |
| 2,249,588 A | 7/1941 | Waddle |
| 2,859,873 A | 11/1958 | Bresee |
| 3,248,018 A | 4/1966 | Fleischman |
| 3,259,078 A | 7/1966 | Radey et al. |
| 3,568,819 A | 3/1971 | Mann |
| 3,858,733 A | 1/1975 | Morioka et al. |
| 3,926,290 A | 12/1975 | Isojima et al. |
| 4,039,062 A | 8/1977 | Carre et al. |
| 4,164,327 A | 8/1979 | Clark |
| 4,177,736 A | 12/1979 | Przybylinski et al. |
| 4,363,350 A | 12/1982 | Beckerer |
| 4,489,862 A | 12/1984 | Diem |
| 4,552,573 A | 11/1985 | Weis et al. |
| 4,598,823 A | 7/1986 | Swinderman |
| 4,603,769 A | 8/1986 | Bach et al. |
| 4,623,056 A | 11/1986 | Flaugher |
| 4,643,293 A | 2/1987 | Swinderman |
| 4,714,151 A * | 12/1987 | Campbell ............... B65G 21/08 198/860.1 |
| 4,775,267 A | 10/1988 | Yamamoto |
| 4,878,576 A | 11/1989 | Dietzen |
| 5,024,319 A | 6/1991 | Dixon et al. |
| 5,123,542 A | 6/1992 | Hoppe |
| 5,160,222 A | 11/1992 | Noland |
| 5,190,132 A | 3/1993 | Stanelle et al. |
| 5,248,344 A | 9/1993 | Hoppe |
| 5,368,192 A | 11/1994 | Ransom, II |
| 5,372,229 A | 12/1994 | Leibling |
| 5,441,321 A | 8/1995 | Karpisek |
| 5,697,375 A | 12/1997 | Hickey |
| 5,697,408 A | 12/1997 | Reeves |
| 5,769,573 A | 6/1998 | Faas et al. |
| 5,993,117 A | 11/1999 | Lancaster et al. |
| 6,102,195 A | 8/2000 | Weikel |
| 6,293,389 B1 * | 9/2001 | Knapp ................... B65G 15/62 198/841 |
| 6,578,694 B2 | 6/2003 | Harris et al. |
| 6,681,921 B1 | 1/2004 | Schroeder |
| 6,827,025 B2 | 12/2004 | Gaydos et al. |
| 6,921,037 B2 | 7/2005 | Wysong et al. |
| 7,000,758 B2 | 2/2006 | Bjorklund |
| 7,003,850 B2 | 2/2006 | Gaydos et al. |
| 7,028,629 B2 | 4/2006 | Walcome |
| 7,228,956 B2 | 6/2007 | Pircon et al. |
| 7,364,034 B1 | 4/2008 | Clark et al. |
| 7,735,620 B2 | 6/2010 | Swinderman |
| 7,958,992 B1 | 6/2011 | Stier |
| 8,727,108 B2 | 5/2014 | Dekoning |
| 8,960,419 B2 | 2/2015 | Kennedy et al. |
| 8,967,357 B2 | 3/2015 | Houssian et al. |
| 9,598,248 B2 | 3/2017 | Raiche |
| 10,246,265 B2 | 4/2019 | Schnitkey |
| 10,676,294 B2 | 6/2020 | Harrenstein et al. |
| 10,766,709 B2 | 9/2020 | Smith |
| 10,926,967 B2 | 2/2021 | Oren et al. |
| 11,066,259 B2 | 7/2021 | Warren et al. |
| 11,136,207 B2 | 10/2021 | Pircon et al. |
| 11,383,933 B2 * | 7/2022 | Lurie .................... B65G 69/18 |
| 2006/0151280 A1 | 7/2006 | Pircon et al. |

FOREIGN PATENT DOCUMENTS

| | | |
|---|---|---|
| CA | 2594426 A1 | 7/2006 |
| CA | 2594426 C | 5/2013 |
| CN | 101175679 A | 5/2008 |
| CN | 101175679 B | 12/2011 |
| DE | 1531910 A1 | 1/1970 |
| DE | 2404157 A1 | 7/1975 |
| DE | 2927316 B1 | 2/1980 |
| DE | 3023898 A1 | 1/1982 |
| EP | 0062769 A1 | 10/1982 |
| EP | 0369605 A1 | 5/1990 |
| EP | 0584441 A1 | 3/1994 |
| EP | 1129965 A2 | 9/2001 |
| EP | 1836112 B1 | 4/2012 |
| FR | 2207074 A1 | 6/1974 |
| JP | S5747123 A | 3/1982 |
| JP | 2008526652 A | 7/2008 |
| JP | 5393983 B2 | 1/2014 |
| KR | 19850005816 A | 9/1985 |
| KR | 1020070106996 A | 11/2007 |
| KR | 100908762 B1 | 7/2009 |
| KR | 1020110056815 A | 5/2011 |
| KR | 1020160056698 A | 5/2016 |
| NL | 7803864 A | 10/1978 |
| RU | 2007130548 A | 2/2009 |
| RU | 2389673 C2 | 5/2010 |
| WO | 2021035041 A1 | 2/2021 |

OTHER PUBLICATIONS

Korean Intellectual Property Office, International Search Report for International Application No. PCT/US2020/047177, dated Nov. 27, 2020, 3 pages.

Korean Intellectual Property Office, Written Opinion of the International Searching Authority for International Application No. PCT/US2020/047177, dated Nov. 27, 2020, 5 pages.

U.S. Appl. No. 16/998,308, filed Aug. 20, 2020, issued as U.S. Pat. No. 11,136,207; and International Application No. PCT/US2020/047177, filed Aug. 20, 2020, published as WO 2021/03541, both of which are entitled "Enclosure and Dust Capture and Reclamation System and Assembly for a Traditional Roller Conveyor."

* cited by examiner

ENCLOSURE AND DUST CAPTURE AND RECLAMATION SYSTEM AND ASSEMBLY FOR A TRADITIONAL ROLLER CONVEYOR

CROSS-REFERENCE TO RELATED APPLICATIONS

The present application is a continuation of U.S. patent application Ser. No. 16/998,308 filed Aug. 20, 2020, which claims priority to and the benefit of U.S. Provisional Patent Application No. 62/889,429 filed Aug. 20, 2019, the contents of which are incorporated in their entirety herein by reference and made a part hereof.

FEDERALLY SPONSORED RESEARCH OR DEVELOPMENT

N/A

FIELD OF THE INVENTION

Dust collection equipment and methodologies for controlling dust and material spillage associated with the operation of a conveyor system for transporting wet or high moisture content bulk materials is described herein.

DESCRIPTION OF THE PRIOR ART

Dust formation from a variety of sources has been a continuing cause of environmental and health concerns. Particular attention has been paid to the dust developed from the handling of coal, but such sources also include, for example, petroleum coke, recycled glass dust and bauxite. Thus, while in this specification, reference is often made to coal, it should be understood that this discussion is applicable to numerous other dust sources as well.

The various industries affected by such dust formation have engaged in many efforts to avoid or to alleviate the problem of dust formation that results during handling, conveyance, transportation and even storage of coal and the other dust sources.

SUMMARY OF THE INVENTION

A dust capture and reclamation system is disclosed for a rubber conveyor belt having a loading side for moving granular material in a first direction, and a return side moving in a second direction opposed to the first direction. The system has a housing for mounting over a portion of the rubber conveyor belt. The housing has a top wall and a pair of opposed side walls. The side walls define a passage connecting an entrance to an exit. The passage is dimensioned to accommodate the rubber conveyor belt. The system further has a plurality of idler roller assemblies to be positioned inside the housing for supporting a portion of the loading side of the rubber conveyor belt. The system also has a plurality of return roller assemblies for supporting a portion of the return side of the belt. A trough is provided for mounting under the rubber conveyor belt to catch granular material falling therefrom. The trough has an inside surface and a mechanism is provided for moving granular material along the inside surface to a collection point. A first access panel is provided through one side wall of the pair of opposed side walls for accessing an idler roller assembly of the plurality of idler roller assemblies. A second access panel is provided through one of the pair of opposed side walls for accessing a return roller assembly of the plurality of return roller assemblies.

Also disclosed herein is a material capture and reclamation assembly for use with a rubber conveyor belt. The conveyor belt is entrained along an endless path and has a loading side and a return side. The assembly includes a housing having a top wall and a pair of opposed side walls. The opposed side wall define a passage connecting an entrance to an exit. The passage is dimensioned to enclose a portion of the rubber conveyor belt. A plurality of idler roller assemblies are positioned inside the housing. The idler roller assemblies are spaced from one another along the passage and support a portion of the loading side of the rubber conveyor belt. A plurality of return roller assemblies are positioned inside the housing and are spaced from one another along the passage for supporting a portion of the return side of the belt. A trough is positioned under the rubber conveyor belt to catch granular material falling from the rubber conveyor belt, and the trough has an inside surface. The assembly has a mechanism for moving granular material along the inside surface to a collection point. A first access panel is provided through one side wall of the pair of opposed side walls for accessing an idler roller assembly of the plurality of idler roller assemblies. A second access panel is provided through one of the pair of opposed side walls for accessing a return roller assembly of the plurality of return roller assemblies.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
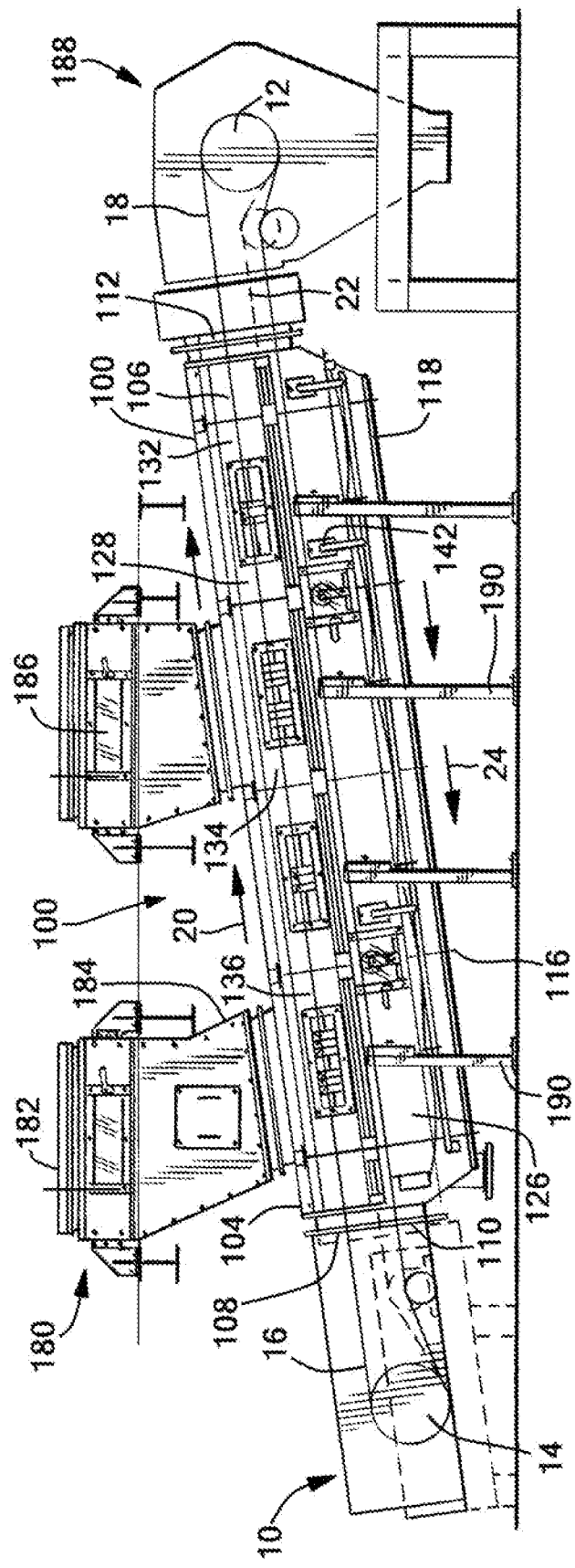
FIG. 1 is a side elevation view of a rubber conveyor belt with an enclosure, and a dust and material capture and reclamation system and assembly of the present invention.
Figure 2:
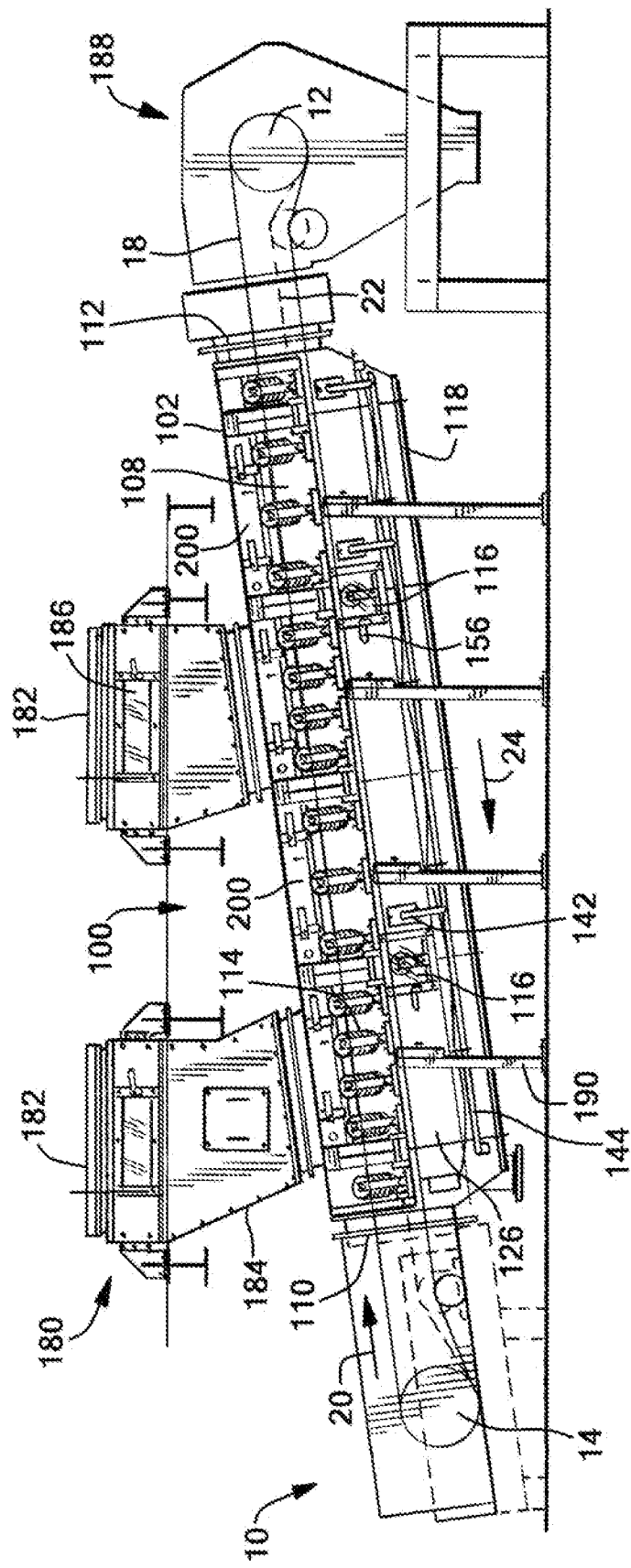
FIG. 2 is the side elevation view of FIG. 1 with panels removed from a side wall.
Figure 3:
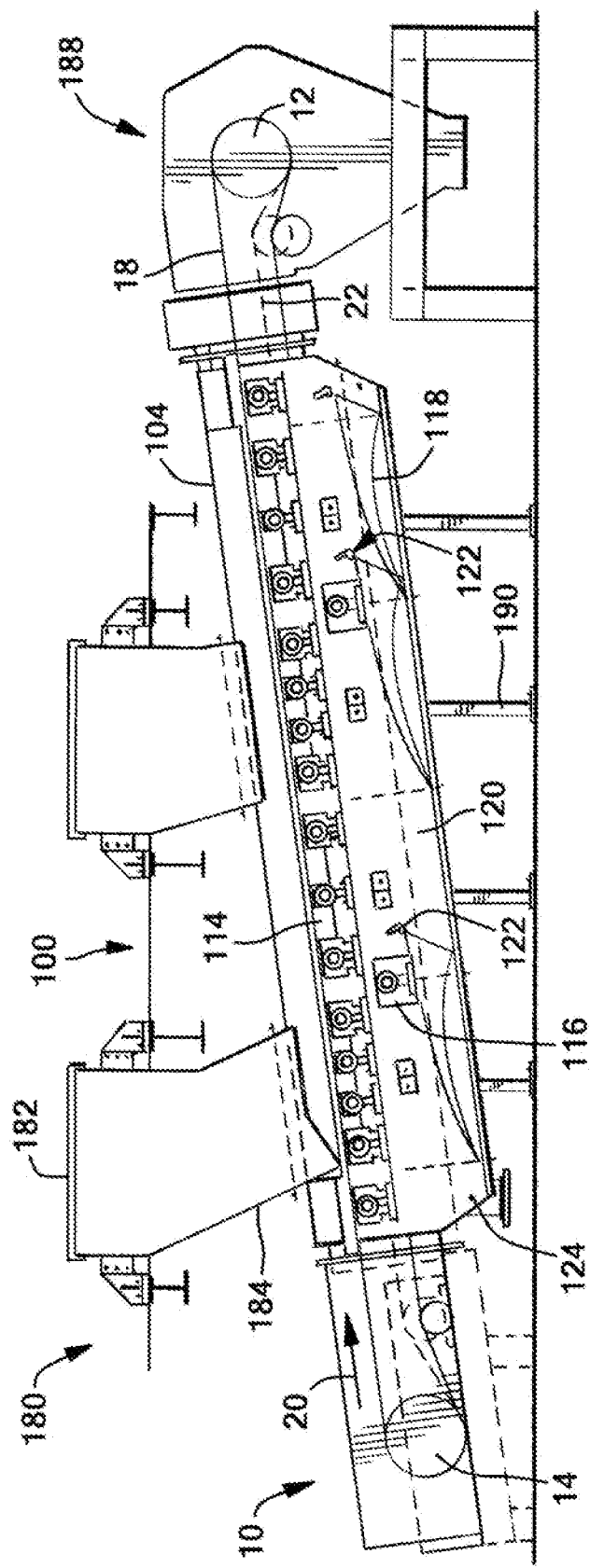
FIG. 3 is a vertical cross-sectional view through a central portion of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-7 show a belt conveyor system 10 and a dust and granular material reclamation system, assembly, and enclosure 100 (dust reclamation system 100 for short) enclosing a portion of the conveyor system 10. The dust reclamation unit 100 can be a standalone unit for retrofitting to an existing conveyor system 10, or the dust reclamation system 100 can be manufactured or assembled and sold together with the belt conveyor system 10 as new equipment.

The belt conveyor system 10 has a driving head pulley 12, a tail pulley 14, and an endless belt 16 entrained thereabout. The belt 16 has a loading side 18 for transporting granular material in a first direction as shown by arrow 20 and a return side 22 moving in a second direction opposite to the first direction shown by arrow 24. An electric motor and gearbox turn the driving head pulley 12. The belt 16 is pulled tight with a tensioning system to produce friction between it and the driving head pulley 12. The friction overcomes the load and drag forces and the belt moves in the direction of the arrow 20 around the endless circuit from the tail pulley 14 to the head pulley 12, loaded with material, and back to the tail pulley 16 empty of most material.

The belt can be made of metal, rubber, plastic, composites, fabric, metal and combinations of any of these. The material conveyed on the conveyor belt includes granular, wet or high moisture content bulk materials including, for example, coal, petroleum coke, recycled glass, bauxite, grains, oilseeds, absorbent clay, borax, fertilizers among many others. The material can be friable i.e., easily crumbled to form dust and small particles. The material can be of varying granularity from particles having a width dimension that spans an entire width of the conveyor belt, on the large end of sizes, to medium sized particles having a width of two feet to about 12 inches, to medium-small particles having a width of less than 12 inches but greater than 3 inches, to small particles having a width of less than 3 inches but greater than 0.1 inches, to very small particles having a width dimension of less than 0.1 inches to a minimum level of detection such as 0.01 inches, 0.001 inches (thousandths of an inch), 0.0001 inches (ten thousandths of an inch), 0.00001 inches (hundred thousandths of an inch), and so on.

The dust reclamation system 100 has a housing 102 for mounting over a portion of the rubber conveyor belt 16. The housing 102 has a top wall 104, a pair of opposed side walls 106 defining a passage 108 connecting an entrance 110 to an exit 112. The housing 102 is shown having a flat top wall 104 to form a flat roof. However, the top wall 104 could be configured to form a gable roof, a hip roof, a dutch roof, a mansard roof, a shed roof, and a gambrel roof for example.

The opposed side walls 106 are segmented having a bottom portion 126 and a top portion 128. The top portion has removable panels 130 that can be removed to access the passage 112 to clean and service the system 100 and the idler roller assemblies 116. A first panel 132 has three widows 134 to see inside the passage and a second panel 136 has two viewing windows 138. The number, size, and shape of the windows can vary provided they allow for visual inspection from outside to inside of the housing. The panel is held in place by a pin or pins that can be removed by hand of an operator of the system and the panel lifted away to access the passage 112.

Figure 4:
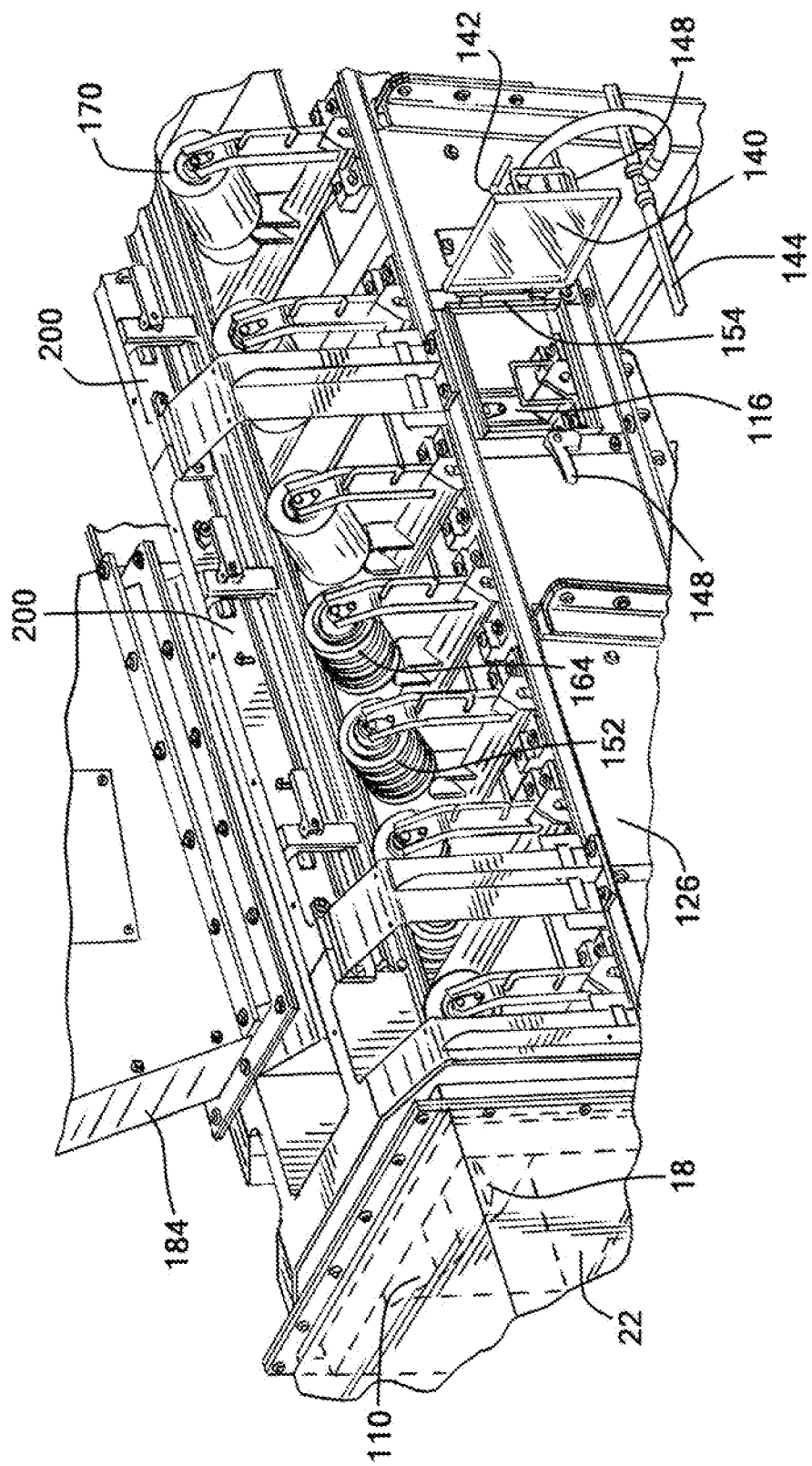
FIG. 4 is an enlarged perspective view of roller assemblies within the enclosure.

FIG. 4 shows the bottom portion of the side wall 126 has access doors 140 for servicing the return roller assemblies 116. The access door 140 is mounted by a pair of hinges 154 to the sidewall and has a mechanism for locking and unlocking the door. The door can also have a handle 148. The locking mechanism shown includes an arm 156 pivotally moveable from a locked condition to an unlocked condition. The arm 156 is moveable by a hand of an operator of the system without the use of a tool. When the access door 140 is in an open condition, the return roller assemblies 116 can be removed through the access door 140 for servicing and then returned into place through the open access door. The door can then be closed and locked during operation of the system.

Figure 8:
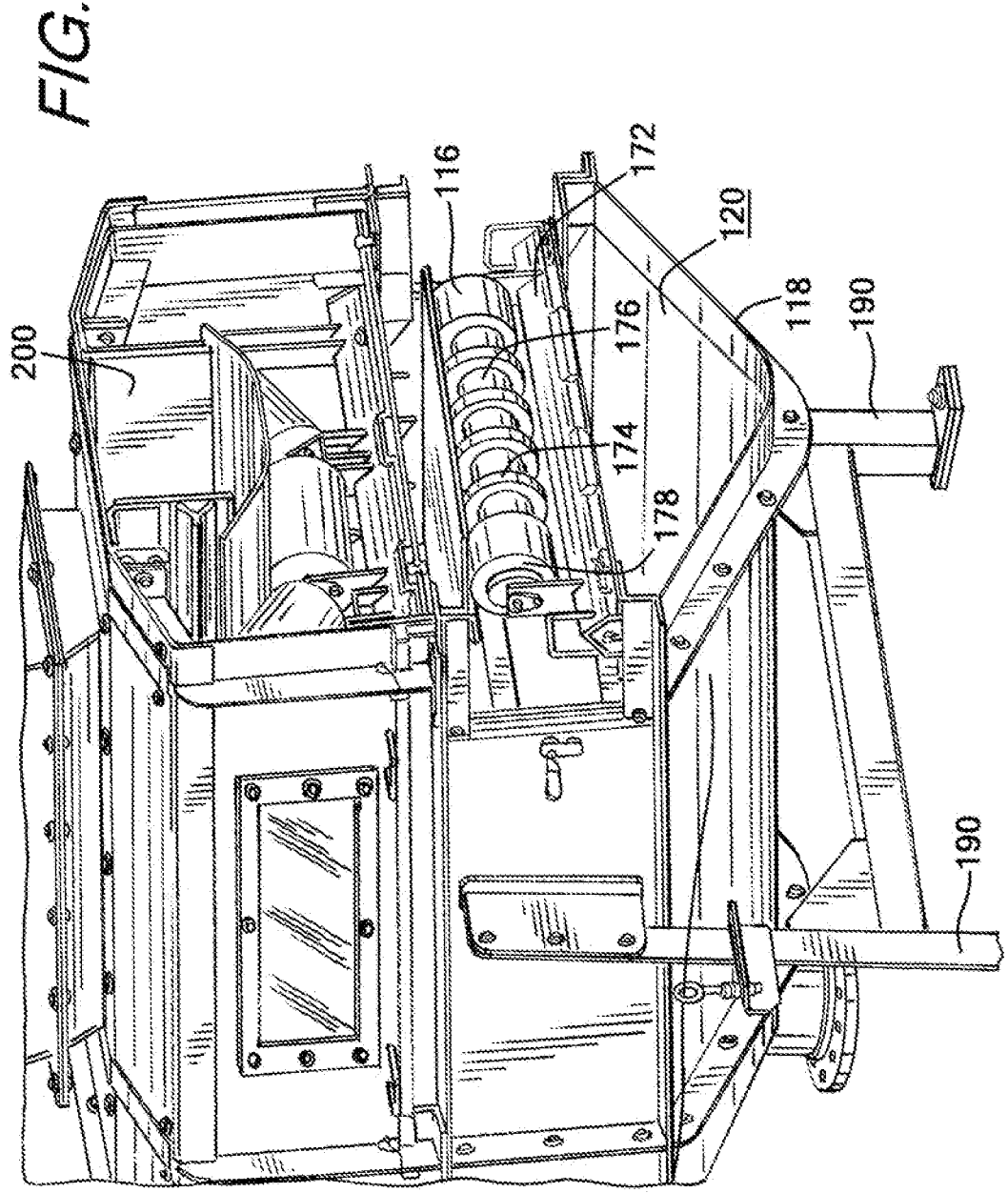
FIG. 8 is a perspective view in cross section showing a return roller

In one preferred form of the invention, the bottom portion of side wall 126 also has through holes to define ports 142. A fluid supply line 144 connects a source of liquid or gas under pressure (not shown) to a spray head 146 mounted inside the passage 112 (FIG. 8). A portion of the fluid supply line passes through the port. The spray head 146 is mounted over the trough 118 and directs a pressurized stream of air or liquid onto the inside surface of the trough 120 to move granular material and dust therealong to the collection point 124. Three ports 142 are shown but a fewer or a greater number of ports 142 could be provided. The spray heads can direct spray can direct spray in any direction desired including in the same direction as the belt is moving, in an opposite direction of belt direction, directly downward, at an acute angle to the belt direction, an obtuse angle, or perpendicular to the belt direction.

Figure 6:
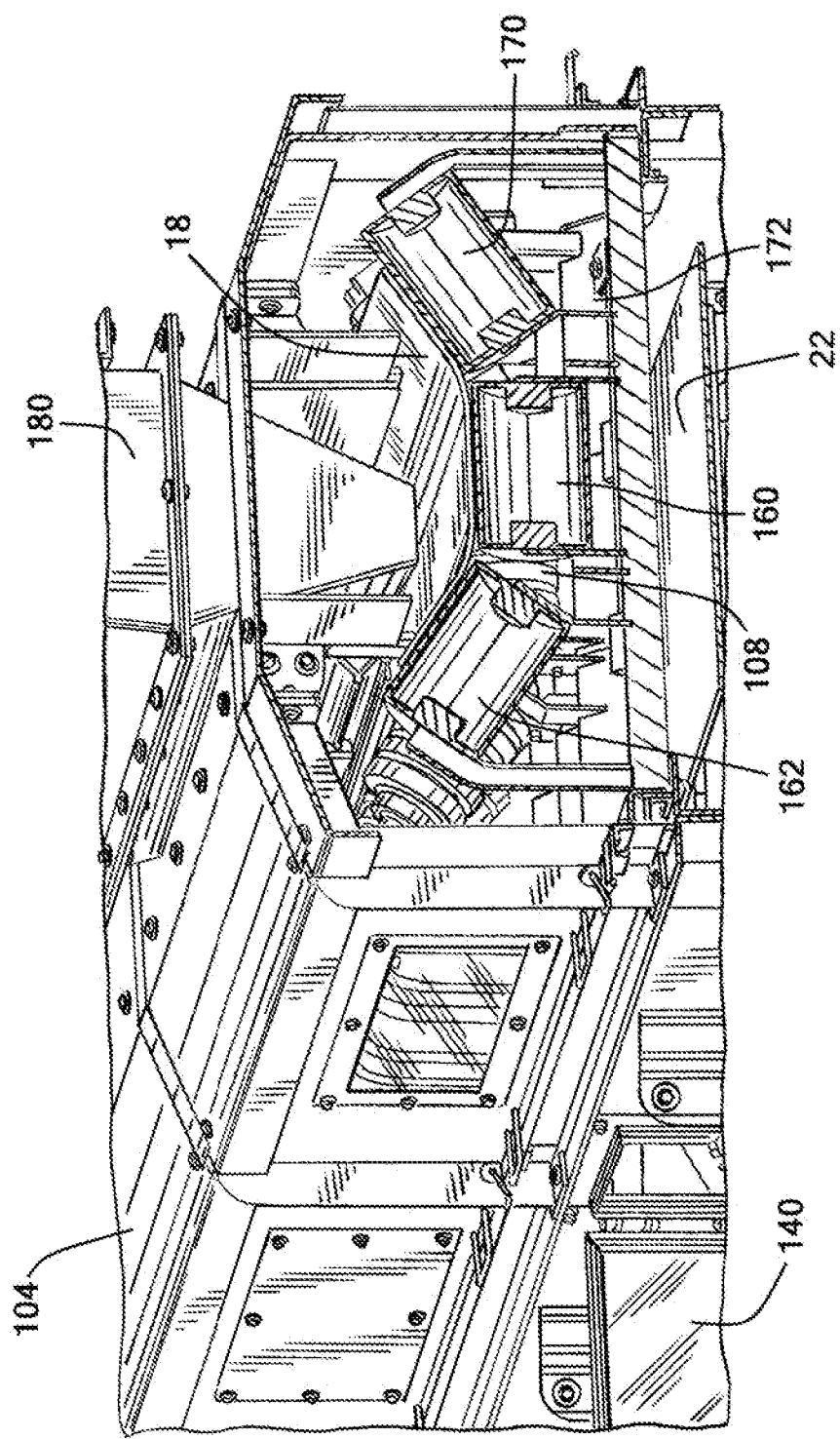
FIG. 6 is a view of FIG. 1 with certain panels removed from the side walls and with inspection hatch doors open.
Figure 7:
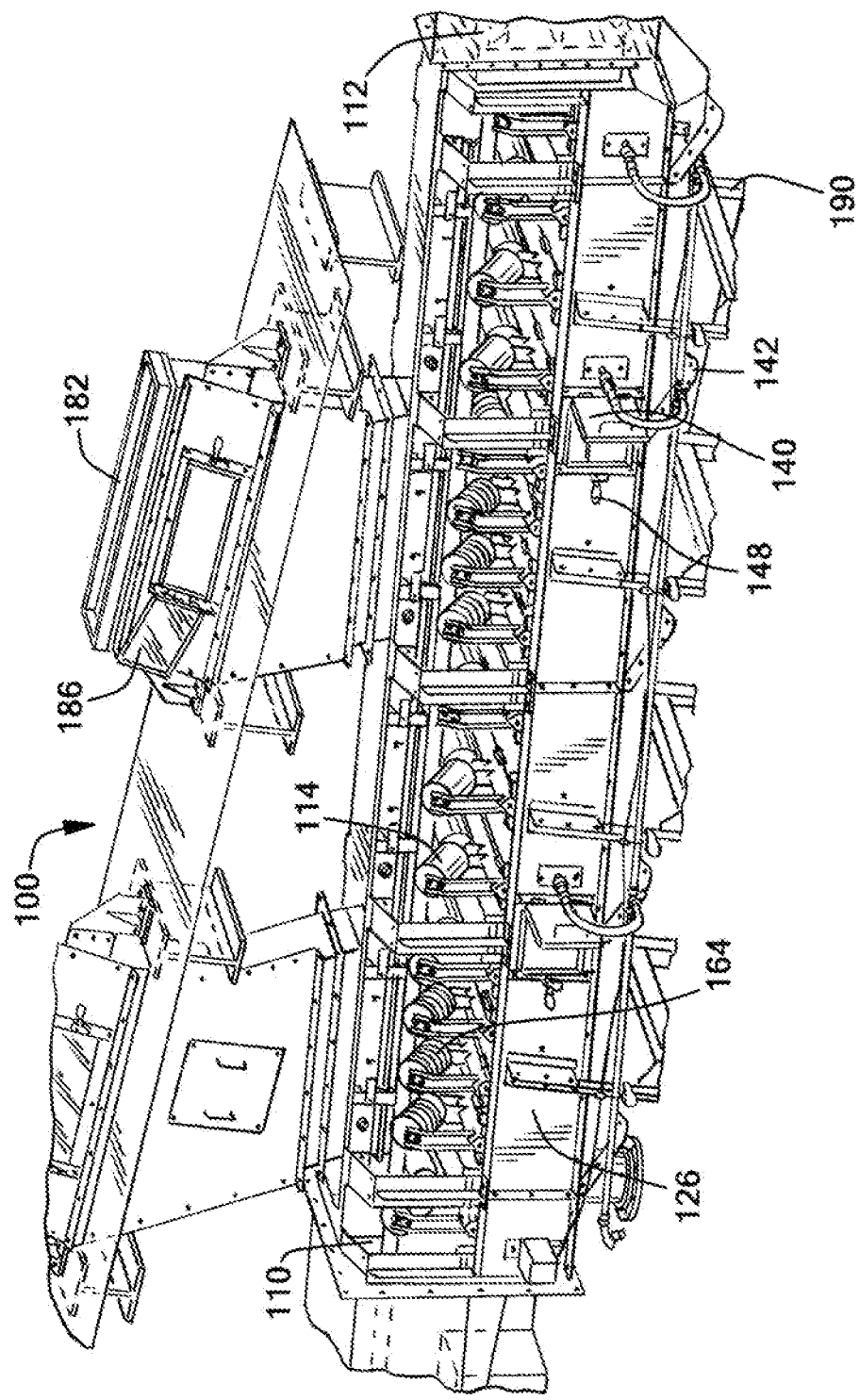
FIG. 7 is a perspective view of the capture and reclamation system and assembly with several side panels removed and access door in an open condition.

FIG. 4 shows the plurality of idler roller assemblies 106 are spaced from one another and are mounted in alignment between the head and tail drive rollers 14,16. Each idler roller assembly 106 has a set of three roller assemblies—two lateral idler roller assemblies 152 flanking a central roller assembly 150. The rail 158 extends cross wise through the passage and is mounted at opposed ends to the housing 102. Each roller assembly 150,152 can be slid along the rail 158 from an operating position as shown in FIG. 4, inside the housing, to a service position outside of the housing. The idler roller assemblies 150,152 can be serviced after removal of the respective removable side wall panel 130. A base of each idler assembly can be secured to the rail using threaded fasteners or other securing mechanism. The centrally disposed roller assembly 150 has a roller 160 that rotates about a first axis of rotation parallel to a line drawn perpendicular across a width of the conveyor belt 12. The lateral roller assemblies 152 have a lateral roller 162 that rotates about a second axis of rotation disposed at an acute angle to the first axis of rotation. The three roller assemblies 150,152 form a trough shaped support for the conveyor belt 16 (FIG. 6).

Figure 5:
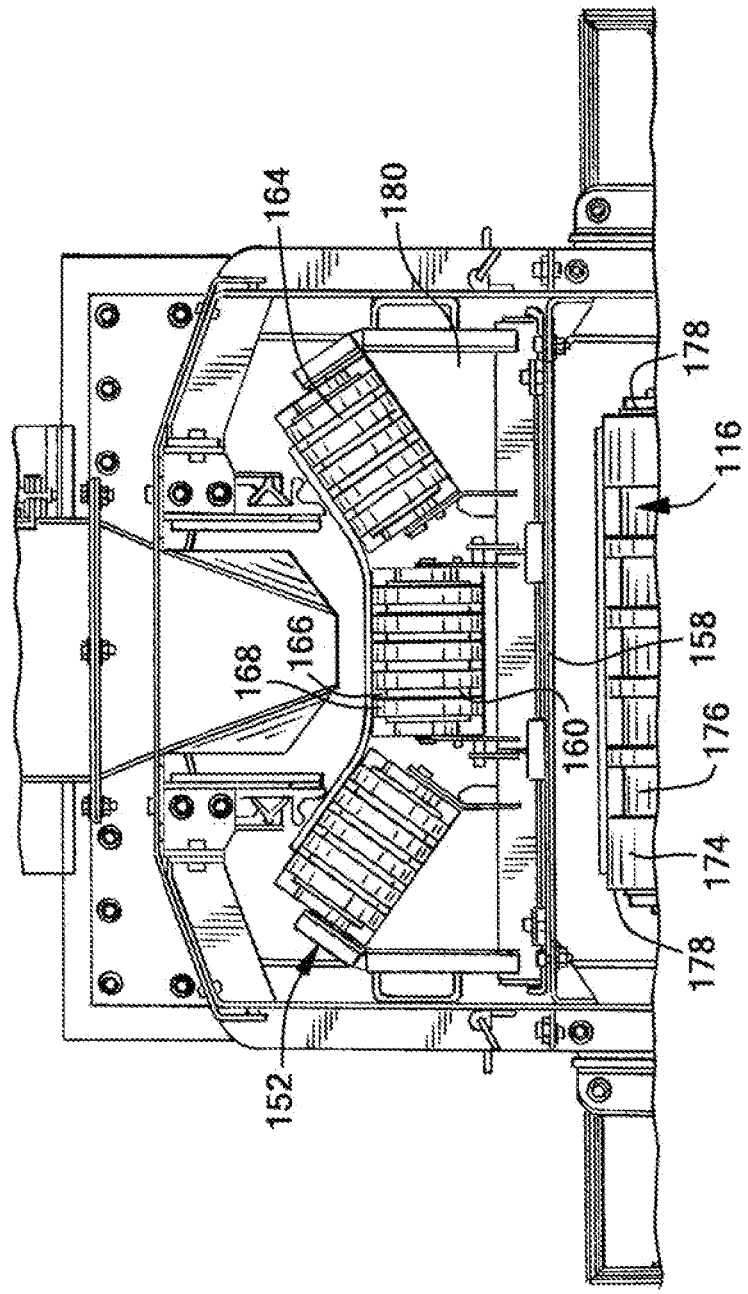
FIG. 5 is a front elevation view of a roller assembly within the enclosure.

FIGS. 4-7 show two varieties of rollers. The first type of roller is known as an impact roller 164. The impact roller 164 as best seen in FIG. 5 has a generally cylindrically shape with an outer surface in the form of a repeat pattern of square shaped valleys 166 and square shaped peaks 168. The second type of roller is a standard roller 170 that is cylindrically shaped and has a smooth outer surface that has a constant diameter. In one preferred embodiment, the impact rollers 164 are placed in locations where granular material is dropped onto the belt 16 during a loading process. The standard rollers are placed in places where loading does not occur.

FIGS. 5 and 8 show a return roller assembly 116 having a return roller 172 that spans the width of the conveyor belt and is slidably mounted on a rail 172, similar to the idler roller assemblies. The return roller 172 is generally cylindrical and has an outer surface having a repeating pattern of square peaks 174 and square valleys 176. At opposed ends 178 are square peaks 174 that have a greater axial dimension than the other square peaks. The return roller assemblies can be accessed through the access door 140 and slid out for servicing and slid into operating position by an operator of the system. The return roller assemblies are positioned below and in partial contact with the return side 22 of the belt 16.

Figure 9:
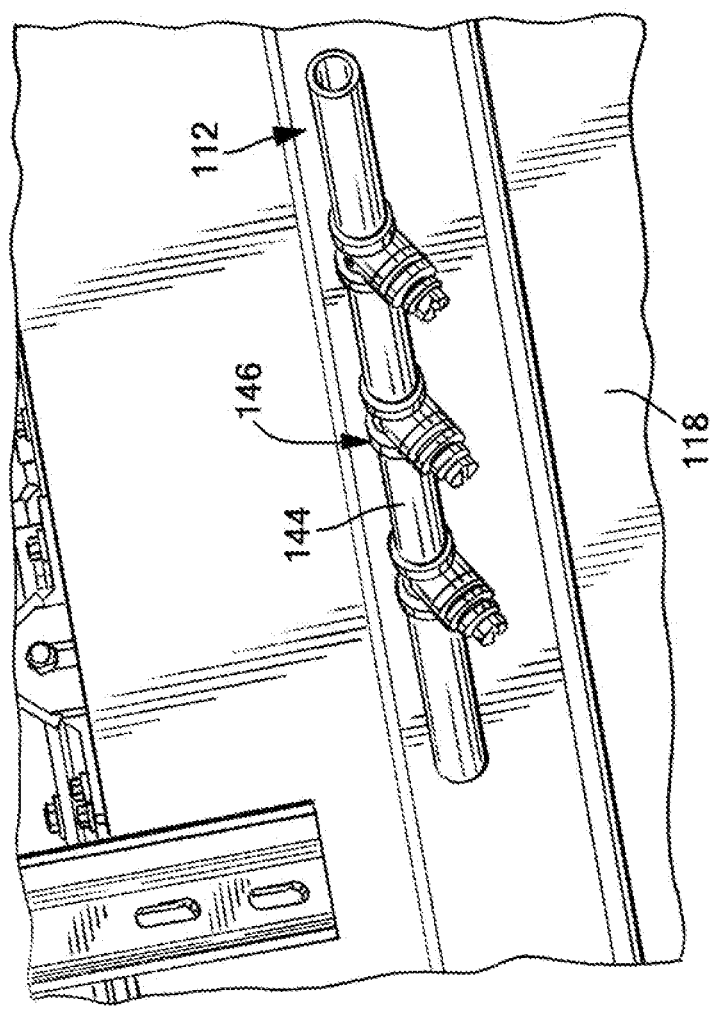
FIG. 9 is a perspective view showing spray heads inside the housing

FIG. 9 shows the trough 118 mounted under the rubber conveyor belt 16 to catch granular material falling therefrom. The trough 118 can be modular having numerous segments of trough panels mounted under the belt 16. Individual trough panels can be removed for servicing without having to remove all of the trough panels.

Figure 10:
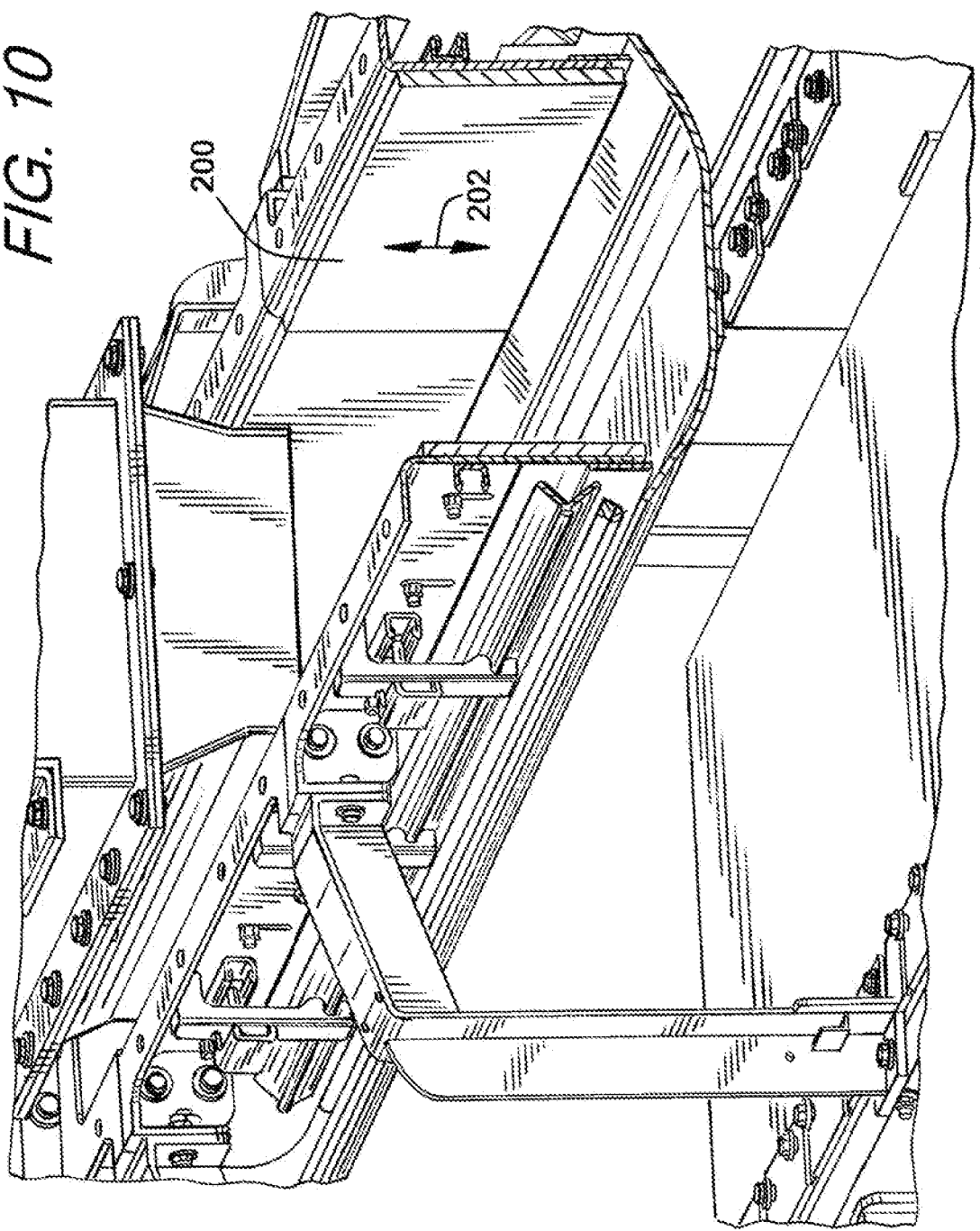
FIG. 10 is an enlarged view of a skirtboard assembly inside the housing.

FIG. 10 shows an optional skirtboard assembly 200 that is mounted along lateral edges of the belt and inside the housing 102 to reduce spillage. The skirtboard is adjustable as shown by the arrows 202 to various levels of height above the loading side 18 of the belt. One suitable skirtboard assembly is sold by Benetech under the trademark Max-Zone® 150.

Two loading chutes 180 are shown for loading bulk material onto the belt 16. The loading chutes have a generally rectangular housing defining an internal passageway for directing the grain from a top end 182 of the chute to a bottom end 184 of the chute. A portion of the top wall 104 is removed to form a hole to allow grain to flow through the chutes onto the belt 16. The chutes have inspection doors 186 near the top of the chutes. The inspection doors are moveable from an open condition to a closed condition as needed to service the chute.

An unloading chute 188 is provided at one end of the system 100 where granular material is offloaded from the belt for storage or for transport elsewhere.

The dust reclamation system 100 have a plurality of legs 190 supporting the system. The legs 190 can have varying lengths or can be adjustable for leveling and adjusting the slope to a desired degree the belt 16 travels with respect to a horizontal surface. The system 100 is shown at an angle of 16° but can be varied from 0° to 30°, more preferably from 0° to 20°, and most preferably from about 0° to 15°.

Figure 11:
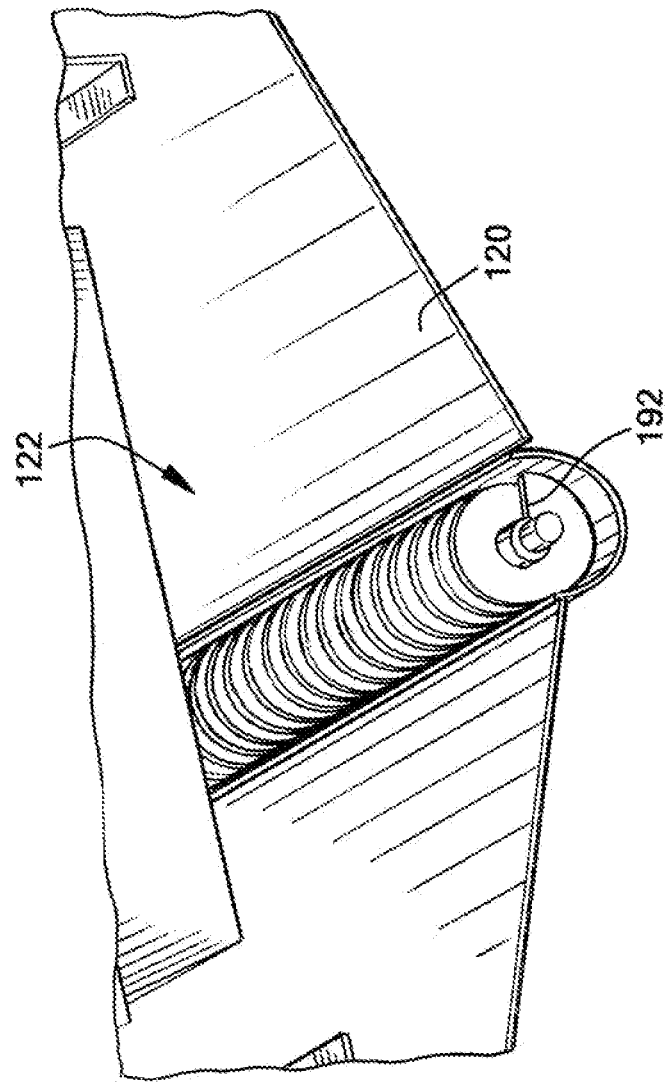
FIG. 11 is a perspective view of a screw conveyor.

FIG. 11 shows an alternative mechanism 122 for moving dust through the trough in the form of a screw conveyor 192 extending along a length of the conveyor belt 12 and powered by a motor not shown. Dust is conveyed out of the trough to a collection location not shown.

Figure 12:
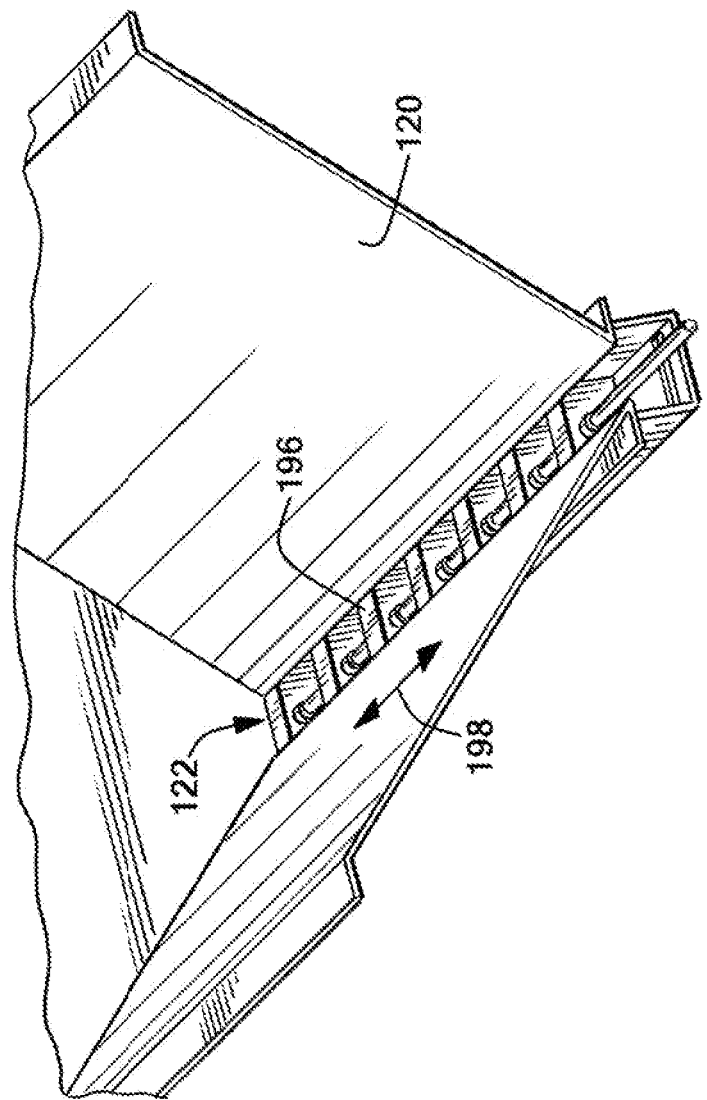
FIG. 12 is a perspective view of a moving paddle conveyor.

FIG. 12 shows another embodiment of the mechanism 122 for moving dust through the trough using a plurality of paddles 196 that move in reciprocating fashion as indicated by arrows 198 to direct bulk material to the collection area or container such as a sack or bag.

It is contemplated using other dust recovery mechanisms including oscillating cleaning with sacks, pneumatic conveying, Benetech PACS with collection sacks, and air collection with bags or cartridges. The dust reclamation mechanisms 130,140 can be retrofitted to existing standard roller conveyor belt systems or be in included as part of the initial conveyance system when initially installed.

Many modifications and variations of the present invention are possible in light of the above teachings. It is, therefore, to be understood within the scope of the appended claims the invention may be protected otherwise than as specifically described.

We claim:

1. A dust capture and reclamation system for a conveyor belt having a loading side for moving granular material in a first direction, and a return side moving in a second direction opposed to the first direction, the system comprising:
    a housing for mounting over a portion of the conveyor belt having a top wall, a pair of opposed planar side walls connecting an entrance to an exit and defining a passage therebetween dimensioned to accommodate the conveyor belt;
    a trough for mounting under the conveyor belt to catch granular material falling from the conveyor belt, the trough having an inside surface; and,
    a mechanism for moving granular material along the inside surface of the trough to a collection point.

2. The system of claim 1 further comprising:
    a plurality of idler roller assemblies to be positioned inside the housing for supporting a portion of the loading side of the conveyor belt; and,
    a plurality of return roller assemblies for supporting a portion of the return side of the belt.

3. The system of claim 2 further comprising:
    a first access panel through one side wall of the pair of opposed side walls for accessing an idler roller assembly of the plurality of idler roller assemblies; and,
    a second access panel through one of the pair of opposed side walls for accessing a return roller assembly of the plurality of return roller assemblies.

4. The system of claim 1 wherein the conveyor belt is rubber.

5. The system of claim 1 further comprising a skirtboard system extending upward from a top surface of the conveyor.

6. The system of claim 1 wherein the mechanism for moving granular material along the inside surface to a collection point is a spray jet.

7. The system of claim 6 wherein the spray jet has one end adapted to be connected to a source of pressurized air or a pressurized liquid.

8. The system of claim 7 wherein the spray jet has a second end opposed to the first head having a spray head.

9. The system of claim 1 wherein the mechanism for moving granular material along the inside surface to a collection point is a screw conveyor.

10. A material capture and reclamation assembly for use with a conveyor belt entrained along an endless path having a loading side and a return side, the mechanism comprising:
    a housing having a first planar side wall and an opposing second planar side wall dimensioned to enclose a portion of the conveyor belt;
    a trough under the conveyor belt to catch granular material falling from the conveyor belt, the trough having an inside surface; and,
    a mechanism for moving granular material along the inside surface to a collection point.

11. The system of claim 10 wherein the first side wall having a bottom portion and a top portion.

12. The system of claim 11 further comprising:
    a plurality of idler roller assemblies inside the housing and spaced from one another along the passage and supporting a portion of the loading side of the rubber conveyor belt; and,
    a plurality of return roller assemblies inside the housing and spaced from one another along the passage for supporting a portion of the return side of the belt.

13. The system of claim 12 further comprising:
    a first access panel through the first side wall for accessing an idler roller assembly of the plurality of idler roller assemblies; and, a second access panel through one of the first and second side walls for accessing a return roller assembly of the plurality of return roller assemblies.

14. The system of claim 10 wherein the conveyor is rubber.

15. The system of claim 10 wherein the mechanism for moving granular material along the inside surface to a collection point is a spray jet.

16. The system of claim 15 wherein the spray jet has one end adapted to be connected to a source of pressurized air or a pressurized liquid.

17. The system of claim 16 wherein the spray jet has a second end opposed to the first head having a spray head.

18. The system of claim 10 wherein the mechanism for moving granular material along the inside surface to a collection point is a screw conveyor.

19. The system of claim 10 further comprising a skirtboard system extending upward from a top surface of the conveyor.

20. The system of claim 19 wherein the skirtboard system is mounted for reciprocating translational motion along a line drawn perpendicular to a surface of the conveyor belt.

\* \* \* \* \*